United States Patent [19]

Montarges et al.

[11] Patent Number: 5,357,503
[45] Date of Patent: Oct. 18, 1994

[54] DYNAMIC MANAGEMENT SYSTEM FOR A SET OF EQUIPMENTS INTERCONNECTED BY A TELECOMMUNICATION NETWORK

[75] Inventors: Jean Montarges, Fontenay le Fleury; Claude Destouesse, Argenteuil, both of France

[73] Assignee: Alcatel Telspace, Nanterre Cedex, France

[21] Appl. No.: 18,541

[22] Filed: Feb. 17, 1993

[30] Foreign Application Priority Data

Feb. 19, 1992 [FR] France ................. 92 01879

[51] Int. Cl.$^5$ ................ H04L 12/24; H04L 12/46; H04L 12/56; H04Q 11/04
[52] U.S. Cl. ................... 370/58.3; 370/60; 370/94.1; 370/94.3
[58] Field of Search ............... 370/54, 58.1, 60, 60.1, 370/85.1, 85.13, 85.14, 94.1, 94.3, 110.1, 58.2, 58.3; 340/825.02, 826, 827; 379/219, 220, 221, 269; 455/4.1, 4.2, 11.1, 12.1, 49.1, 51.1, 51.2, 53.1, 54.1

[56] References Cited

U.S. PATENT DOCUMENTS

| | | | |
|---|---|---|---|
| 4,933,936 | 6/1990 | Rasmussen et al. | 370/94.3 |
| 4,979,118 | 12/1990 | Kheradpir | 370/54 |
| 5,056,085 | 10/1991 | Vu | 370/94.1 |
| 5,138,615 | 8/1992 | Lamport et al. | 370/94.3 |
| 5,150,405 | 9/1992 | Lee et al. | 370/110.1 |

OTHER PUBLICATIONS

Proceedings of the IEEE, vol. 79, No. 1, Jan. 1991, New York, US, pp. 7-20, R. B. Robrock II "The Intelligent Network-Changing the Face of Telecommunications".

Bell Laboratories Record, vol. 57, No. 2, Feb. 1979, Murray Hill, N.J., US, pp. 38-45, S. Katz et al.: "A sophisticated switched service".

Proceedings of the IEEE, vol. 78, No. 7, Aug. 1990, New York, US, pp. 1304-1310, M. A. Allen: "Management and Control of CCSDS Cross-Support Services".

International Defense Review, No. 9, 1980, Cointrin-Geneva, Switzerland, pp. 100-103, "Ptarmigan-A Secure Area Communications System for The British Army".

IEEE Military Communications Conference, vol. 2, Oct. 20, 1985, Boston, US, pp. 510-514, A. Fauvet et al.: "The Rita System".

*Primary Examiner*—Alpus H. Hsu
*Attorney, Agent, or Firm*—Sughrue, Mion, Zinn, Macpeak & Seas

[57] ABSTRACT

A dynamic management system for a set of traffic data transmission equipments connected by a traffic telecommunication network and operating together in variable configurations matched to the requirements of network users includes a management support telecommunication network having a plurality of nodes which are constituted by management data switching and access equipments associated with respective traffic data transmission equipments and assembled into a meshed network which is topologically independent of the traffic network and uses flooding mode broadcasting.

6 Claims, 2 Drawing Sheets

DYNAMIC MANAGEMENT SYSTEM FOR A SET OF EQUIPMENTS INTERCONNECTED BY A TELECOMMUNICATION NETWORK

CROSS-REFERENCES TO RELATED APPLICATION

This application is related to co-pending application Ser. No. 08/018,540 assigned to the same assignee.

BACKGROUND OF THE INVENTION

1. Field of the invention

The present invention concerns a dynamic management system architecture for a set of equipments interconnected by a telecommunication network and working together in variable configurations matched to the requirements of network users. The invention applies to a tactical telecommunication network using microwave links, for example.

2. Description of the prior art

A tactical network of this kind (see FIG. 1) comprises a set of nodal stations CN located at the nodes of the network and each comprising a switching unit or switch CT connected to a plurality of equipments ET which in this example are microwave link equipments connected in turn either to network users AB or to other equipments ET at other nodal stations of the network to constitute a meshed network.

Microwave links are advantageously used in a tactical network because they enable the network to be reconfigured when under attack simply by moving one or more of its nodal stations in response to such attack.

Matching a tactical telecommunication network to the requirements of users which, in military applications, include resistance to attack, requires management data to be exchanged between the various network components and in particular between a network command center (CC), or more generally a network management center, and the equipments constituting the network whose operation and movements must be monitored by the network command center.

Management data is usually exchanged in both directions, namely from the managed equipments to the command center and from the command center to the managed equipments. This data is usually called remote supervisory or alarm data in the former case and telecontrol data in the latter case. In all cases it concerns operating parameters of the managed equipments such as frequency, power output, bit rate, etc.

It is known to transmit management data using a management support telecommunication network which is so called to distinguish it from the traffic network with which this description has been concerned until now and over which traffic data is transmitted. The management support network and the traffic network may be one and the same, in which case the management network behaves like a particular group of network users. In the case of fixed infrastructure traffic networks it is also known to use a management support network separate from the traffic network to prevent blocking situations should the traffic network fail. It is also known to transmit management data over service channels set up in parallel with traffic channels. In the case of a microwave link network, for example, this parallelism can be achieved by multiplexing within the microwave frame.

In all these various cases the management data is thus usually transmitted in a point-to-point manner between the managed equipments and the management center.

The major drawback of these methods is that they do not guarantee sufficient transmission security for management data, in particular if the traffic network is under attack, or during network reconfiguration maneuvers.

An object of the present invention is to provide a management system architecture which is able to avoid this drawback.

SUMMARY OF THE INVENTION

The present invention consists in a dynamic management system for a set of traffic data transmission equipments connected by a traffic telecommunication network and operating together in variable configurations matched to the requirements of network users, said system comprising a management support telecommunication network the nodes of which are constituted by management data switching and access equipments associated with respective traffic data transmission equipments and assembled into a meshed network which is topologically independent of the traffic network and uses flooding mode broadcasting.

Other objects and features of the present invention will emerge from the following description of one embodiment of the invention given by way of example for an application to a tactical telecommunication network using microwave links and with reference to the appended drawings.

DETAILED DESCRIPTION OF THE INVENTION

Figure 1:
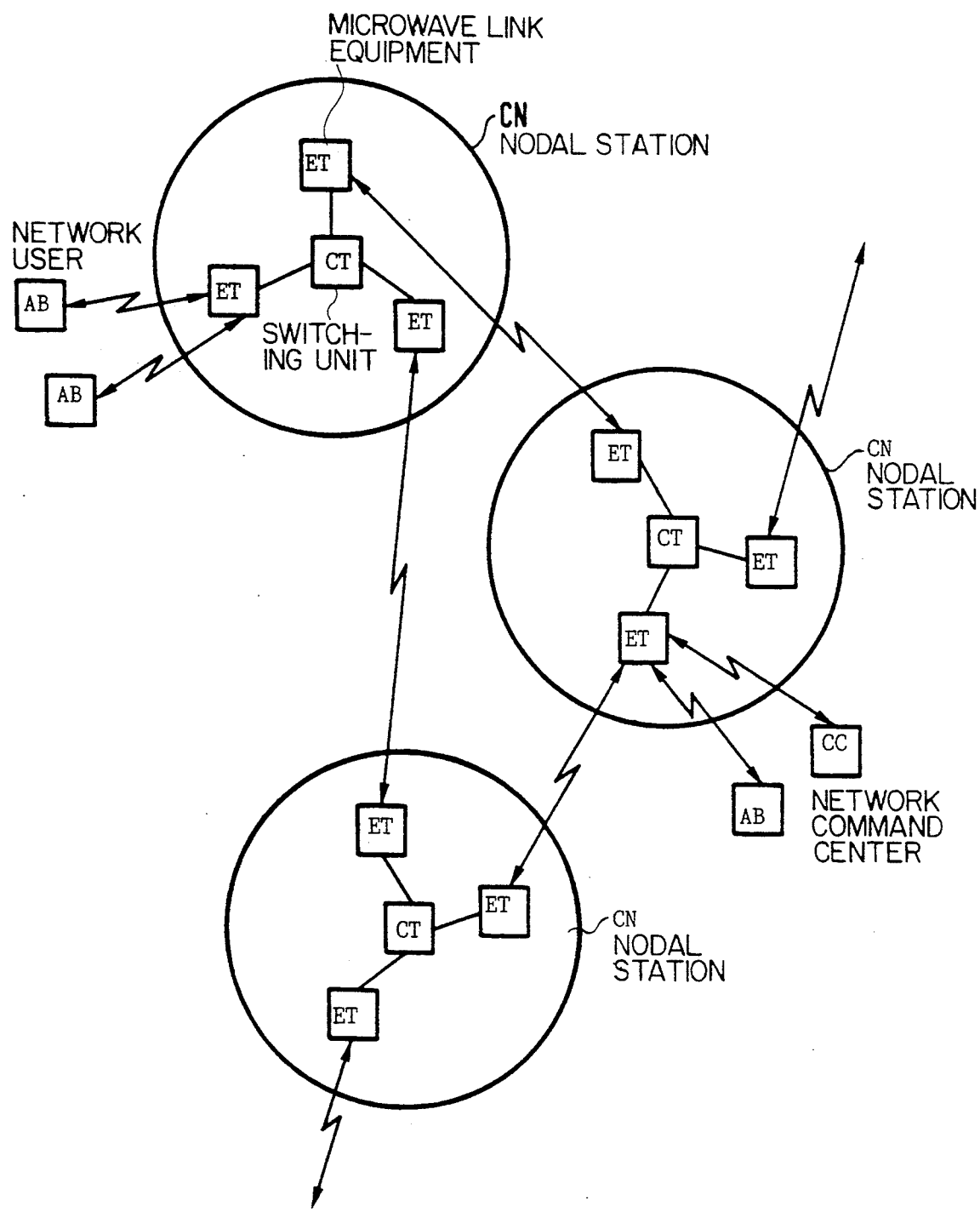
FIG. 1, already described, relates to the prior art.
Figure 2:
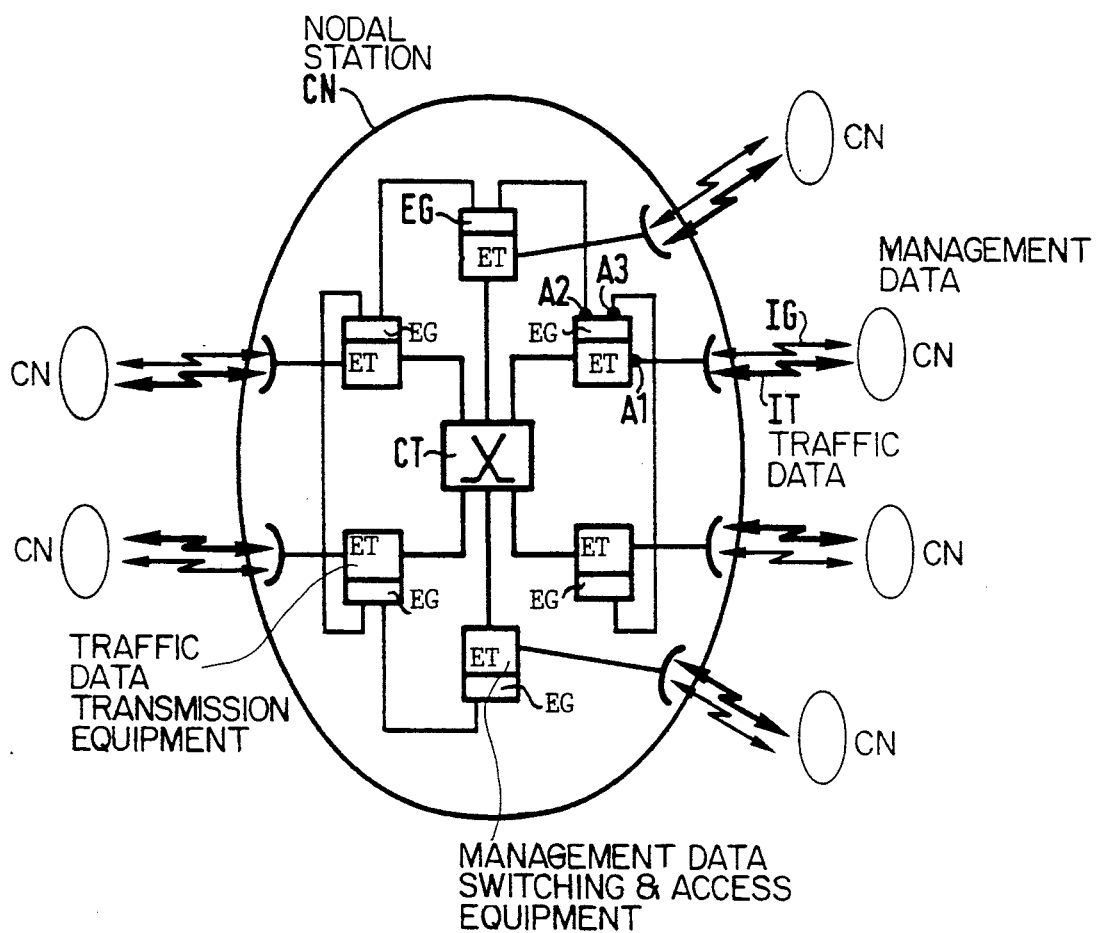
FIG. 2 is a block diagram of a nodal station in a tactical telecommunication network equipped with a management system in accordance with the invention.

The nodal station CN shown diagrammatically in FIG. 2 comprises a traffic switch CT connected to a plurality of traffic data transmission equipments ET of which there are six in this example and which constitute the equipments to be managed.

Each traffic data transmission equipment ET is associated with a management data switching and access equipment EG. These management data switching and access equipments EG constitute the nodes of a management support telecommunication network so called to distinguish it from the traffic telecommunication network carrying traffic data exchanged between network users.

Each management data switching and access equipment EG has three management support network ports or network ports connecting it to three other management data switching and access equipments EG of the management support network plus a port (not separately identified in FIG. 2) or equipment port connecting it to the management equipment.

The equipment EG in question is connected to an equipment EG of another nodal station (not shown) of the network by a network port A1 via the associated transmission equipment ET over a microwave link.

The other two network ports A2, A3 are connected by cable links to two other equipments EG at the same nodal station, in this instance the two equipments EG nearest the equipment concerned.

Note that the number of network ports may be greater than three without departing from the scope of the present invention.

Note likewise that the number of managed equipments ET associated with the same management equipment EG can be greater than one without departing from the scope of the present invention and that in this case the equipment EG would have a corresponding number of equipment ports.

The port A1 being connected via the associated equipment ET, the traffic data IT and management data IG are transmitted on different channels of the same microwave link as diagrammatically shown in FIG. 2.

The port A1 could be connected by a cable link like the ports A2 and A3 without departing from the scope of the invention.

The set of equipments EG interconnected in this way forms a meshed management support network transmitting management data between the network command center and the management data switching and access equipments associated with respective traffic data transmission equipments.

Note that the command center may be regarded as a special management data switching and access equipment EG and so can be moved within the management support network if this is reconfigured.

Figure 3:
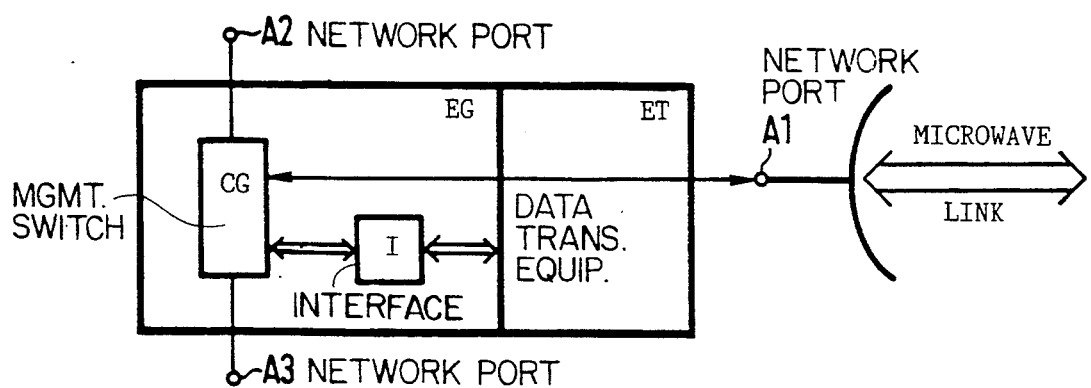
FIG. 3 is a block diagram of a management data switching and access equipment in a management system in accordance with the invention.

The equipment EG shown in FIG. 3 comprises a management switch CG whose network ports are the ports A1, A2, A3 and which routes management data sent or received by the equipment EG over the management network.

The management switch is connected to the managed equipment ET via an interface I which formats management data received at the network ports A1, A2 and A3 for the equipment ET in a form suitable for its reception by this equipment and management data sent by the equipment ET in a form suited to its transmission from the management switch ports A1, A2 and A3.

Management data is routed over the management support network in the known "flooding" broadcast mode whereby an equipment EG which receives such data on any of the three network ports retransmits it once from both of the other network ports which guarantees redundant routing of such data. If an equipment EG is the originator of data sent in this way it sends the data directly from the three network ports.

In the case of transmission of management data using the known packet-switched transmission mode, the management switch CG is a packet switch, for example, the interface I being in this case a packet assembler-disassembler. The management switch, which has a low capacity given its restricted number of ports, and this interface are advantageously implemented on the same component or circuit board (depending on the degree of integration).

In the case of implementation on a circuit board, for example, the board carries means defining an interface with the managed equipment and with the management network and means defining a management message switching function, in this example a packet switching function, utilizing the "flooding" routing technique.

At the interface with the managed equipment the circuit board formats remote supervisory and telecontrol messages at the managed equipment input and output.

At the interface with the management network this circuit board:

sends remote supervisory messages originating from the equipment, recognizes messages addressed to the managed equipment and processes them so that they can be forwarded to that equipment, manages acknowledgement of messages addressed to the managed equipment.

The circuit board may be either integrated into the equipment to be managed or housed in a separate unit.

There is claimed:

1. Dynamic management system for managing a set of traffic data transmission equipments connected by a traffic telecommunication network transmitting traffic data for operation together in variable configurations matched to requirements of network users, said system comprising a management support telecommunication network having a plurality of nodes constituted by a management data switching and access equipments each associated with at least one of said respective traffic data transmission equipment, said management data switching and access equipments being interconnected to form a meshed network being topologically independent of the traffic telecommunication network and said management data switching and access equipments using flooding mode broadcasting for transmitting management data.

2. System according to claim 1 wherein each management data switching and access equipments comprises a message switch having at least three network ports for broadcasting said management data over all of said management support telecommunication network and at least one equipment port for inputting/outputting to/from said traffic data transmission equipment being managed equipments.

3. System according to claim 2 wherein said management data is transmitted between said management data switching and access equipments associated with said traffic data transmission equipments and a management center which is regarded as a special management data switching and access equipment which can be located at any point in said management support telecommunication network.

4. System according to claim 1 wherein said traffic telecommunication network constitutes a mobile tactical telecommunication network.

5. System according to claim 2 wherein said message switch is a packet switch.

6. System according to claim 1 wherein said management data transmitted between said management data switching and access equipments is transmitted over a transmission channel different from that over which the traffic data of all managed equipments associated with said management data switching and access equipments is transmitted.

* * * * *